United States Patent
McCann et al.

(10) Patent No.: US 10,275,499 B2
(45) Date of Patent: Apr. 30, 2019

(54) TAG SELECTION, CLUSTERING, AND RECOMMENDATION FOR CONTENT HOSTING SERVICES

(71) Applicant: deviantArt, Inc., Los Angeles, CA (US)

(72) Inventors: Andrew Simz Arneson McCann, Vancouver (CA); Roger David Donaldson, Vancouver (CA)

(73) Assignee: deviantArt Inc., Los Angeles, CA (US)

( * ) Notice: Subject to any disclaimer, the term of this patent is extended or adjusted under 35 U.S.C. 154(b) by 0 days.

(21) Appl. No.: 15/376,665

(22) Filed: Dec. 13, 2016

(65) Prior Publication Data

US 2017/0220582 A1 Aug. 3, 2017

Related U.S. Application Data

(63) Continuation of application No. 14/014,776, filed on Aug. 30, 2013, now Pat. No. 9,519,685.

(60) Provisional application No. 61/695,009, filed on Aug. 30, 2012.

(51) Int. Cl.
*G06F 17/30* (2006.01)
*G06F 15/16* (2006.01)

(52) U.S. Cl.
CPC .... *G06F 17/3053* (2013.01); *G06F 17/30283* (2013.01); *G06F 17/30554* (2013.01); *G06F 17/30598* (2013.01); *G06F 17/30867* (2013.01); *G06F 17/30873* (2013.01)

(58) Field of Classification Search
CPC .......... G06F 17/3053; G06F 17/30867; G06F 17/30283
USPC ................................. 707/748, 740
See application file for complete search history.

(56) References Cited

U.S. PATENT DOCUMENTS

| | | | |
|---|---|---|---|
| 6,598,054 B2 | 7/2003 | Schuetze | |
| 7,401,087 B2 * | 7/2008 | Copperman | G06F 17/30616 707/737 |
| 7,814,107 B1 * | 10/2010 | Thirumalai | G06F 17/30011 707/749 |
| 8,176,072 B2 | 5/2012 | Jayakody | |
| 8,321,424 B2 | 11/2012 | Li | |
| 8,572,105 B2 * | 10/2013 | Kim | G06F 17/30905 707/802 |
| 8,886,636 B2 | 11/2014 | Gabrilovich | |
| 9,305,084 B1 | 4/2016 | McCann | |

(Continued)

*Primary Examiner* — Usmaan Saeed
*Assistant Examiner* — Brian E. Weinrich
(74) *Attorney, Agent, or Firm* — Heidi Brun Associates Ltd.

(57) ABSTRACT

Content object tags at a content hosting service are used to classify stored content objects. Tags and clusters of tags (groups of one or more associated tags) can be recommended to a user of the content hosting service based on a user context, such as the browsing, viewing, uploading, or searching of content objects. Tags are scored based on content objects tagged with the tags in a targeted subset of content objects and a baseline subset of content objects, and based on the relevance of the content objects tagged with the tags. These tag scores can be weighted, and one or more tags can be selected for recommendation based on the weighted tag scores. Tag clusters can be selected for recommendation using a cluster hierarchy and determining whether a targeted subset of tags occur within a maximum number of tag clusters at a particular hierarchy level.

22 Claims, 6 Drawing Sheets

(56) References Cited

U.S. PATENT DOCUMENTS

| | | | |
|---|---|---|---|
| 9,519,685 B1 | 12/2016 | McCann | |
| 2004/0158569 A1* | 8/2004 | Evans | G06F 17/30702 |
| | | | 707/999.1 |
| 2006/0143175 A1* | 6/2006 | Ukrainczyk | G06F 17/218 |
| | | | 707/999.006 |
| 2007/0019793 A1* | 1/2007 | Cheng | G10L 15/06 |
| | | | 379/88.01 |
| 2007/0288498 A1* | 12/2007 | Dietz | G06F 17/30864 |
| | | | 707/999.102 |
| 2008/0294678 A1 | 11/2008 | Gorman | |
| 2009/0254572 A1* | 10/2009 | Redlich | G06Q 10/06 |
| | | | 707/999.01 |
| 2011/0029533 A1 | 2/2011 | Jayakody | |
| 2011/0029561 A1* | 2/2011 | Slaney | G06F 17/30247 |
| | | | 707/749 |
| 2012/0109982 A1 | 5/2012 | Jayakody | |
| 2012/0191728 A1* | 7/2012 | Libin | G06F 17/30884 |
| | | | 707/748 |
| 2012/0198196 A1 | 8/2012 | Song | |
| 2012/0284285 A1 | 11/2012 | Cohen | |
| 2012/0301032 A1* | 11/2012 | Kawanishi | G06F 17/30247 |
| | | | 382/190 |
| 2013/0132331 A1 | 5/2013 | Kowalczyk | |
| 2014/0006417 A1* | 1/2014 | Mukherjee | G06F 17/3089 |
| | | | 707/748 |

\* cited by examiner

| Level (# of clusters) | Tag # 1 | 2 | 3 | 4 | 5 | ... |
|---|---|---|---|---|---|---|
| 1 | 1 | 1 | 1 | 1 | 1 | ... |
| 2 | 1 | 2 | 2 | 1 | 2 | ... |
| 3 | 3 | 3 | 1 | 2 | 3 | ... |
| 4 | 3 | 2 | 1 | 4 | 2 | ... |
| 5 | 4 | 2 | 3 | 1 | 5 | ... |
| ... | | ... | | | | |

Cluster index

FIG. 4a

| Level (# of clusters) | Tag # 1 | 2 | 3 | 4 | 5 | ... |
|---|---|---|---|---|---|---|
| 1 | 1 | 1 | 1 | 1 | 1 | ... |
| 2 | 2 | 1 | 1 | 2 | 1 | ... |
| 3 | 1 | 1 | 3 | 2 | 1 | ... |
| 4 | 4 | 1 | 3 | 2 | 1 | ... |
| 5 | 4 | 1 | 3 | 2 | 5 | ... |
| ... | | ... | | | | |

Cluster assignment

FIG. 4b

TAG SELECTION, CLUSTERING, AND RECOMMENDATION FOR CONTENT HOSTING SERVICES

CROSS REFERENCE TO RELATED APPLICATIONS

This application is a continuation of U.S. application Ser. No. 14/014,776, filed Aug. 30, 2013, now U.S. Pat. No. 9,519,685, which application claims the benefit of U.S. Provisional Application No. 61/695,009, filed Aug. 30, 2012, all of which is incorporated by reference in its entirety.

FIELD OF ART

The present disclosure generally relates to the field of categorical tags, and more specifically to the selection and clustering of relevant tags for recommendation in content hosting services.

BACKGROUND

The internet has become a medium for the display and playback of various forms of content objects. As used herein, "content object" can refer to digital text (such as a document, a poem, a book, an article, a spreadsheet, and the like), a digital image (such as a digital version of a photograph, a painting, a drawing, a computer-made image, and the like), digital video (such as a digital feature film, a home-video or other amateur-captured video, a music video), a digital sound recording (such as a digital song, a speech, or any other audio clip), a digital animation (such as a .GIF animation, a cartoon, still-motion video, and the like), or any other form of content that is displayed, viewed, or played on a user device over the internet.

Content hosting services on the internet allow users to access content on the content hosting services for display and playback. Content hosting services can allow users to upload content objects to the content hosting services. The content objects uploaded by users may be user-generated content objects. Content hosting services can also retrieve content objects from other entities, such as professional movie studios and music studios, libraries, and the like. One example content hosting system allows users who are artists to upload images of real-world physical artwork created by the user or images including digital artwork created by the user.

Content objects can be organized within a content hosting service in a number of ways. Commonly, tags (labels) are used to categorize content objects. Tags can be taxonomically and hierarchically structured, with varying levels of tag domains. For example, an art-based content hosting service can use a tag taxonomy with a top level "medium" tag (describing a content object's type of artwork, such as "oil painting", "water color", "photography", and "sculpture"), followed by a next level "genre" tag (describing the a content object's subject matter), a "style" tag (describing the artistic style of a content object), and so forth.

In a content hosting service with a large number of content objects, the manual creation of tags and tagging of content objects by editors or operators of the content hosting service becomes infeasible. Accordingly, many content hosting services prompt users to tag content objects that they upload or content objects uploaded by others. Users may incorrectly tag content objects, for instance by providing an incorrect tag for the medium or genre of an artwork, or may complete only a portion of a content object's tag taxonomy, for instance by failing to include a designation of the style of a content object.

In order to improve the accuracy and completeness of tagging, a content hosting service can present recommended tags to a user during tagging. The space available in a content hosting service interface displayed to a user for displaying relevant tags may be limited. In a content hosting service with a deep tag taxonomy or a high number of tags (for instance, hundreds or thousands of tags), the limited space in a content hosting service interface increases the need to select the most relevant tags for recommendation to a user. Similarly, a content hosting service can present recommended tags to a user during the browsing or searching of content objects to improve the user experience, but limited interface space creates the need to select the most relevant tags for recommendation.

SUMMARY

A content hosting service supports a taxonomy of tags for labeling content objects. One or more tags are selected for recommendation to a user based on a user context at the content hosting service. The user context can be determined by whether the user is browsing for content objects, searching for content objects, or uploading content objects. A baseline subset of content objects within a content object corpus at the content hosting service and a targeted subset of the baseline subset of content objects at the content hosting service are selected based on the user context. In a browsing context, the targeted subset of content objects can include other content objects previously viewed by the user or other users, and content objects related to such content objects. In a searching context, the targeted subset of content objects can include content object included in search results received in response to a search query. Finally, in an uploading context, the targeted subset of content objects can include other content objects tagged with all or part of the tags used by the user to tag the uploaded content object.

Each content object in the targeted subset of content objects has previously been tagged with one or more tags, thereby producing a first set of tags. A tag score is determined for each tag in this first set of tags. The tag score for a tag is based on several score components. One such component is a targeted subset count score, which is based on the number of content objects in the targeted subset of content objects tagged with the tag. Another component is the frequency normalization score, which is based on the proportion of the targeted subset of content objects that are tagged with the tag relative to the proportion of the baseline subset of content objects that are tagged with the tag. A third component is the distribution score, which is based on the most relevant content objects in the targeted subset of content objects that are tagged with the tag.

The tag scores determined for the tags can be weighted with one or more weight coefficients. A weight coefficient can be determined for each of the set of the targeted subset count score components, the frequency normalization score components, and the distribution score components. These weight coefficients can be determined in advance based on a desired relative importance of each of the tag score components. Determining a tag score for a tag can include calculating a harmonic mean of the targeted subset count score for the tag, the frequency normalization score for the tag, and the distribution score for the tag, and weighting the harmonic mean with weight coefficients associated with these tag score components.

One or more tags are selected for recommendation to the user based on the tag scores. A quantity of tags to be recommended to the user can be determined, for instance based on available space within a content hosting service user interface for displaying the recommended tags. The determined quantity of tags can be selected from among the tags used to tag the targeted subset of content objects, for instance, a number of the tags with the highest tag scores equal to the determined quantity can be selected. Selected tags can then be displayed to the user within a user interface.

In a second aspect, one or more tag clusters can also be selected for recommendation to a user of a content hosting service based on a user context at the content hosting service. A tag cluster includes one or more associated content object tags. A targeted subset of content object tags is selected based on the user context. In a browsing context, the targeted subset of content object tags can include tags used to tag content objects previously viewed by the user or other users, and tags used to tag content objects related to such content objects. In a searching context, the targeted subset of content object tags can include tags used to tag content object search results received in response to the searching of content objects by the user. Finally, in an uploading context, the targeted subset of content object tags can include tags used to tag content objects tagged with all or part of the tags used by the user to tag the uploaded content object.

A quantity of tag clusters to be recommended to the user can be determined, for instance based on available display space within a content hosting service user interface. A hierarchy level of a cluster hierarchy is queried to determine the number of tag clusters at the queried hierarchy level that include all or a threshold percentage of the targeted subset of tags. The cluster hierarchy includes a hierarchical organization of tag clusters, with each hierarchy level including a greater number of clusters than the level above it and a fewer number of clusters than the level below it. If the number of tag clusters at the queried hierarchy level that include all or a threshold percentage of the targeted subset of tags is equal to or less than the determined quantity of tag clusters to be recommended, then the tag clusters at the queried hierarchy level that include all or a threshold percentage of the targeted subset of tags are selected for recommendation to the user. The selected tag clusters can then be displayed to the user within a user interface.

If the number of tag clusters at the queried hierarchy level that include all or a threshold percentage of the targeted subset of tags is greater than the determined quantity of tag clusters to be recommended, then a second hierarchy level is queried, and the number of clusters at the second queried hierarchy level that include all or a threshold percentage of the targeted subset of tags is determined. The second queried hierarchy level can be one or many levels higher within the cluster hierarchy than the first queried hierarchy level. If this number of clusters at the second queried hierarchy level is equal to or less than the determined quantity of tag clusters to be recommended, the tag clusters at the second queried hierarchy level that include all or a threshold percentage of the targeted subset of tags are selected for recommendation to the user.

In the event that the number of clusters at the second queried hierarchy level that include all or a threshold percentage of the targeted subset of tags is greater than the determined quantity of tag clusters to be recommended, a third hierarchy level may be queried such that the third queried hierarchy level is higher in the cluster, and the process can be repeated. In one embodiment, the levels of the cluster hierarchy are recursively queried until a hierarchy level that contains clusters that include all or a threshold percentage of the targeted subset of tags is identified. Alternatively, the most relevant tag clusters at a particular hierarchy level can be selected for recommendation to a user, where the most relevant tag clusters include the tag clusters at the hierarchy level that include the greatest number of the targeted subset of tags.

A cluster hierarchy can be generated in advance based on the distances between pairs of tags. The distance between a pair of tags can be based on the conditional probability that a content object is tagged with a first of the pair of tags given that it is tagged with a second of the pair of tags, relative to the probability that the content object is tagged with the first of the pair of tags. These distances can be exhaustively calculated for each pair of tags at the content hosting service, or the distances can be estimated based on the number of occurrences of each tag in the pair of tags in user-defined collections of content objects at the content hosting service.

In one embodiment, for N tags at the content hosting service, an N-level hierarchy is generated. Each hierarchy level includes a set of clusters collectively containing the N content objects tags, and each individual cluster at each hierarchy level includes a subset of the N content object tags. For each hierarchy level, a tag belongs to one and only one cluster. Further, in one embodiment, each hierarchy level includes one more cluster than the hierarchy level above it, and one less cluster than the hierarchy level below it. The cluster hierarchy is then stored for subsequent use. In one embodiment, the clusters at each hierarchy level are indexed such that the average number of moves between hierarchy levels for each tag from a first cluster to a second cluster with a different index than the first cluster is minimized. In this embodiment, instead of storing the entire cluster hierarchy, just the index moves between hierarchy levels for each tag can be stored.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 4a is a diagram illustrating an example clustered hierarchy for a set of tags, according to one embodiment.

FIG. 4b is a diagram illustrating the example cluster hierarchy of FIG. 4a with clusters optimally indexed to minimize the cluster index moves for tags in the set of tags, according to one embodiment.

The figures depict embodiments for purposes of illustration only. One skilled in the art will readily recognize from the following description that alternative embodiments of the structures and methods illustrated herein is employed without departing from the principles of the invention described herein.

DETAILED DESCRIPTION

System Overview

Figure 1:
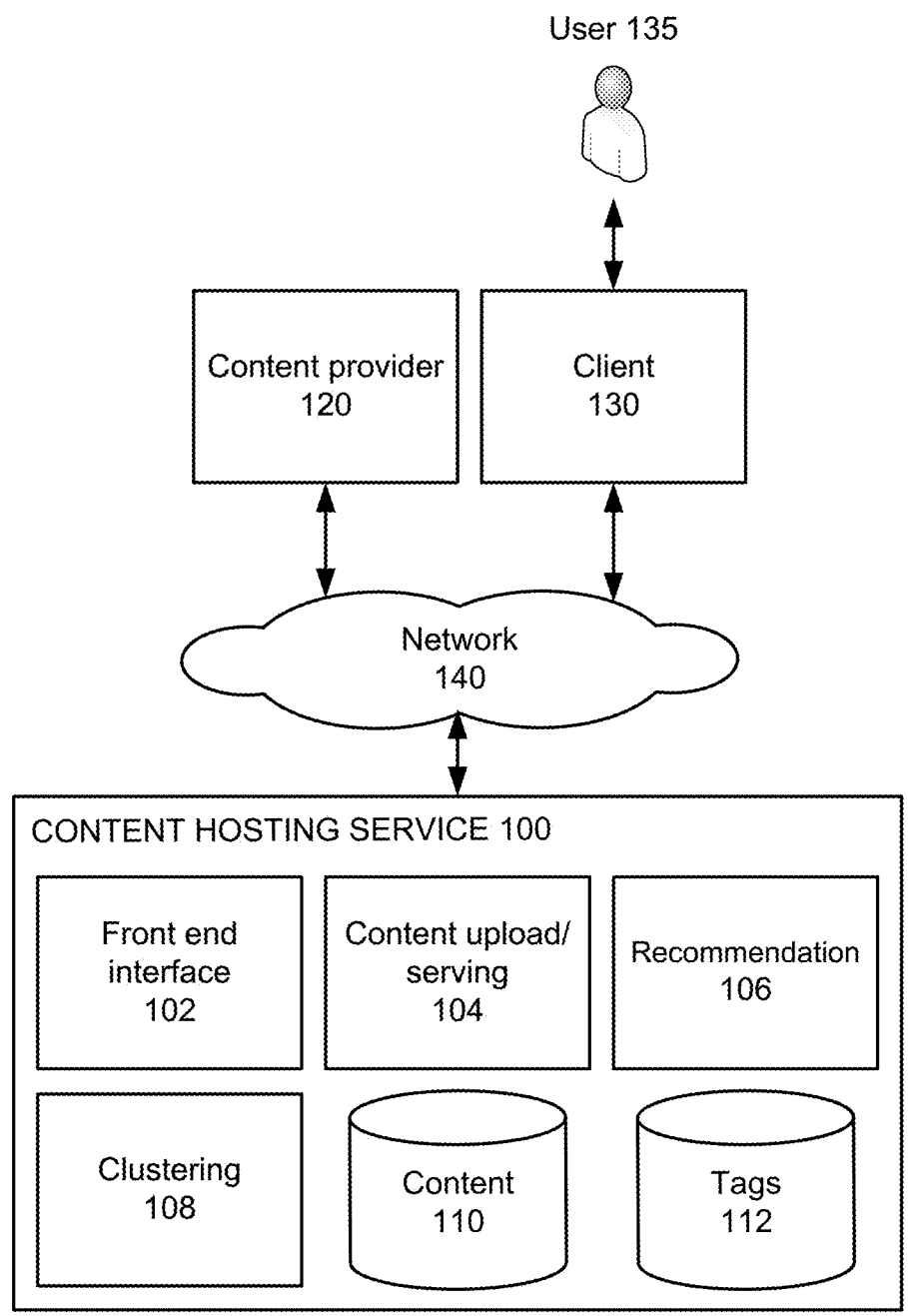
FIG. 1 is a block diagram of a content hosting service environment configured to recommend content object tags and tag clusters to a user, according to one embodiment.

FIG. 1 is a block diagram of a content hosting service environment configured to recommend content object tags and tag clusters to a user, according to one embodiment. The embodiment of FIG. 1 includes a content hosting service 100, a content provider 120, and a client 130, communicatively coupled through the network 140. The content provider 120 provides one or more content objects (collectively referred to herein as "content" or "objects") to the content hosting service 100. The content is of any digital form or format capable of display or playback at the client 130 to a user. It should be noted that although only one content provider 120 and one client 130 are displayed in the embodiment of FIG. 1, in practice, there will be large numbers of such entities, for instance hundreds of content providers and millions of clients.

Content objects can come in a variety of formats. For instance, text-based content objects may be any format capable of displaying text to a user, such as documents, spreadsheets, presentations, source code, and web pages. Image-based content objects may be any format capable of displaying an image to a user, such as the JPEG format and the like. Video-based and animation-based content objects may be any format capable of being played to a user, such as the family of MPEG video formats and the like. Audio-based content objects may be any audio format capable of being played to a user including compressed formats (including both lossy formats (e.g., MPEG-4 AAC), and lossless formats (e.g., FLAC)), as well as uncompressed formats (e.g., LPCM).

The content provider 120 and the client 130 may be any device or service capable of transmitting and/or receiving content from the content hosting service 100 over the network 140. In one embodiment, the content provider 120 and the client 130 are computing devices that execute client software, e.g., a web browser or built-in client application, to connect to, upload content to, and receive content and tag recommendations from the content hosting service 100 via a network 140, to display or playback received content, and to display received tag and tag cluster recommendations. The content provider 120 and the client 130 might be, for example, a personal computer, a personal digital assistant, a mobile phone or smart phone, a tablet, a laptop computer, an internet-enabled television or set-top receiver, and the like. Any such device includes a processor, memory, storage, power supply, network connections, and output means. The network 140 is typically the Internet, but may be any network, including but not limited to a LAN, a MAN, a WAN, a mobile wired or wireless network, a private network, or a virtual private network.

Generally, the content provider 120 provides content objects to the content hosting service 100 and the client 130 accesses objects on the content hosting service 100 and then displays or plays the accessed content objects. In practice, the content provider 120 and the client 130 may be the same device, for instance when the content object is uploaded by the user 135 and then subsequently accessed by that same user. Additionally, the content provider 120 may be the same entity that operates the content hosting service 100. In one embodiment, the content hosting service 100 exposes an application programming interface that enables the content provider 120 to perform various functions at the content hosting service 100. Content provider functions can include, for example, uploading a content object to the content hosting service 100, editing metadata for a content object stored by the content hosting service 100, and tagging a content object using a tag taxonomy at the content hosting service 100. Examples of tags available at the content hosting service 100 include tags identifying the author or creator of the content, the medium of the content, the genre of the content, the identity of any individuals associated with the content (for instance, the actors in video content, the musical artist in song content, etc.), the style of the content, the subject matter of the content, the material used in making the content, or any other property associated with the content.

Similarly, the content hosting service 100 exposes an application programming interface that enables a client device to perform various client functions at the content hosting service 100. Client functions include enabling a user to establish an account at the content hosting service 100, to tag content objects at the content hosting service 100, and to navigate, browse, and search content objects at the content hosting service 100 using selectable tags recommended and presented by the content hosting service 100.

One such client function that a user of a content provider or a client device can perform is organizing content objects stored at the content hosting service 100 into collections. As used herein, the one or more content objects organized into a collection are referred to as "members" of the collection. A collection of content objects is a set of associated content objects, stored at the content hosting service 100, that are selected by a user, a content provider, the content hosting service 100, or any other entity (or combination thereof). The set of content objects in a collection may be selected for any reason. For example, a collection of content objects can be assembled wherein the content objects therein have one or more properties in common. Thus, a collection can include content objects selected based on the type of content object (for instance, videos, oil paintings, sculptures, photographs, etc.), based on the subject matter or theme of the content object (e.g., dogs, baseball, flowers), based on the author or creator of the content object, or based on any other property of content objects identifiable by meta-data stored in conjunction with the content objects. Collections can also include content objects selected based on subjective properties, for instance properties reflective of a user's taste in content objects, and thus are not limited to groups of content objects with common objective properties.

The content hosting service 100 is configured to recommend tags and tag clusters (groups of related tags) to the content provider 120 and the client 130 in a variety of contexts. The content hosting service 100 can recommend tags and tag clusters (referred to collectively hereinafter as "recommended tags") to the uploader or creator of a content object uploaded to the content hosting service 100. In this upload context, the uploader or creator can tag the uploaded content object by selecting the recommended tags. Separately, the content hosting service 100 can recommend tags and tag clusters to a viewer of an uploaded content object. In this browsing context, the viewer can tag the uploaded object by selecting a recommended tag, or the viewer can select a recommended tag to view additional content objects tagged with the recommended tag or with a tag in a recommended tag cluster. The content hosting service 100 can recommend tags and tag clusters to a user performing a search on the content hosting service 100. When a user performs a search, the content hosting service 100 returns a set of search results and displays recommended tags to the user in conjunction with the set of search results. In this context, in response to a user selecting a recommended tag, the set of search results can be refined to results tagged with the selected tag or with a tag in the selected tag cluster, or a new search can be performed for content objects tagged with the selected tag or with a tag in the selected tag cluster.

The content hosting service 100 can display recommended tags within a content hosting service interface. The displayed recommended tags can be displayed in a dedicated "recommended tags" portion of the interface, can be displayed in conjunction with displayed content objects or search results, or can be displayed in a content object uploading interface. The number of displayed recommended tags may depend on the context of the displayed recommended tags. For instance, if the amount of interface space available to display recommended tags is limited (for example, as a result of a crowded user interface or a small user device display), only a few recommended tags may be displayed. Likewise, if a large amount of interface space is available to display recommended tags, a larger number of recommended tags may be displayed. Recommended tags can be displayed below a content object, in a margin of the content hosting service interface, in a pop-window or the like. A button or other interface element may be displayed in conjunction with recommended tags that, when selected, displays additional recommended tags that otherwise are not displayed.

Displayed recommended tags can be selectable links such as HTML hyperlinks. Upon the selection of a recommended tag by a user, a content hosting service can retrieve additional information for display to the user, such as additional content objects associated with the selected tag, filter content objects based on the selected tag, or associate content objects with the selected tag. The selection of a recommended tag may direct a user to a different content hosting service page associated with the selected tag, or may cause information associated with the selected tag to be displayed in a portion of the content hosting service interface or in an additional interface, such as a pop-up window.

The recommended tags and recommended tag clusters can be displayed in separate interfaces or interface portions, or can be displayed together. The content hosting service 100 can display recommended tag clusters by displaying a name of the tag cluster, a representative tag of the tag cluster, a random tag within the tag cluster, multiple tags within the tag cluster, or any other information identifying the tag cluster. The content hosting service 100 can indicate that a displayed recommended tag cluster is a tag cluster (and not, for instance, merely a recommended tag), by displaying the recommended tag cluster in a different font, in a font style (such as bold), in a different color, or in conjunction with a button (such as a "+" button) that, when selected, expands the recommended tag cluster to show the tags within the tag cluster.

The content hosting service 100 represents a system such as that of DEVIANTART™ that stores and provides content objects such as images to users via clients, such as client 130. The content hosting service 100 communicates with content providers and clients via the network 140 to facilitate the receiving of and displaying/playback of content objects between entities. The content hosting service 100 may be implemented in a cloud computing network, accessible by the content provider 120 and the client 130 over the network 140. The content hosting service 100 is configured to tag recommendations to a user based on, for example, search results, previously viewed content objects, uploaded content objects, and the like.

The content hosting service 100 includes a front end interface 102, a content upload/serving module 104, a recommendation engine 106, a clustering engine 108, a content storage module 110, and a tags storage module 112. Other conventional features, such as firewalls, load balancers, authentication servers, application servers, failover servers, site management tools, and so forth, are not shown so as to more clearly illustrate the features of the content hosting service 100. While an example of a suitable content hosting service 100 is the DEVIANTART website, found at www.deviantart.com, other content hosting sites can be adapted to operate according to the teachings disclosed herein. The content hosting service 100 may display or play content objects to a user via a content hosting service interface, such as a GUI associated with a website or service. The illustrated components of the content hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the content hosting service 100 can also be performed by a content provider 120 in other embodiments if appropriate. It should be further appreciated that the various functions described herein for the content hosting service 100, and in particular those functions relating to the selection of tags and tag clusters for recommendation, and the clustering of tags, are sufficiently complex as to require their implementation in a computer system, and cannot be performed by in the human mind by mental steps.

The front end interface 102 provides the interface between the various components of the media hosting service 100 and the content provider 120 and client 130. The content upload/serving module 104 receives content objects from the content provider 120 and stores the content objects in the content storage module 110, for instance, at the request of the content provider. The content upload/serving module 104 can store content provider-selected, user-selected, and auto-generated tags associated with content objects in the tags storage module 112.

Each content object stored in the content storage module 110 is associated with a unique object identifier. Similarly, each tag stored in the tags storage module 112 can include a unique tag identifier. The tag identifiers of tags associated with a particular content object can be stored in conjunction with the content object in the content storage module 110, and the object identifier of a particular object associated with one or more tags can be stored in conjunction with the one or more tags in the tags storage module 112. Thus, the tags associated with a content object can be identified by determining the tag identifiers stored in association with the content object, and the content objects associated with each tag can be identified by determining the object identifiers stored in association with each tag. As described above, the tags stored in the tags storage module 112 can be organized into a tag taxonomy of any number of levels, with any number of tags available for association with one or more content objects at each level.

The content upload/serving module 104 also retrieves content objects stored at the content storage module 110 and transmits, via the front end interface 102, the retrieved content objects to the client 130, for instance, at the request of the client 130. Although not illustrated the embodiment of FIG. 1, the content hosting service 100 may include additional components allowing a user of a client 130 to perform various client functions as described above, for instance, the searching of content objects stored at the content hosting service 100 such as by entering textual queries containing keywords of interest, or browsing content objects stored at the content hosting service 100 such as by filtering content objects by tags identifying the object type, creator, category, and the like.

The content upload/serving module 104 can receive a selection of content objects by a user for association in a collection. In one embodiment, each collection includes a unique collection identifier stored in associated with a unique object identifier for each content object member of the collection in the content storage module 110. In such an embodiment, the collections to which a content object belongs can be determined by querying the content storage module 110 with the unique object identifier for the content object and receiving the one or more unique collection identifiers associated with the collections to which the content object belongs. Likewise, in such an embodiment, the content objects belonging to a collection can be determined by querying the content storage module 110 with the unique collection identifier for the collection and receiving the one or more unique object identifiers associated with the content object members of the collection.

The recommendation engine 106 identifies a user context associated with a user of the content hosting service 100, and selects one or more tags to recommend to the user based on the user context, and is one means for performing this function. Example user contexts include the searching of content objects, the uploading of content objects, the browsing of content objects, and the like. The recommendation engine 106 can determine a maximum number of tags that are to be recommended (for instance, based on the amount of display space available in a content hosting service interface), and can select a number of tags based on and up to the determined maximum. The recommendation engine 106 is described in greater detail below with regards to FIG. 2. Tags selected for recommendation by the recommendation engine 106 can be displayed to a client 130 via the front end interface 102 and/or the content upload/serving module 104.

The clustering engine 108 clusters the tags stored in the tags storage module 112 within a cluster hierarchy, creates a cluster index for the cluster hierarchy, and stores the cluster index in the tags storage module 112, and is one means for performing this function. The cluster index is determined in such a way as to minimize the number of moves between levels of the cluster hierarchy for the tags in the cluster hierarchy. As used herein, the moves a tag makes between levels of the cluster hierarchy refers to the change in a first cluster index associated with a cluster at a first level of the cluster hierarchy to which the tag belongs to a second, different cluster index associated with a cluster at a second, adjacent level of the cluster hierarchy to which the tag belongs. In one embodiment, instead of storing the entire cluster index in the tags storage module 112, the clustering engine 108 stores the moves for each tag between clusters at different levels of the cluster hierarchy in association with each tag in the tags storage module 112. The clustering engine 108 then identifies a user context associated with a user of the content hosting service 100, and selects one or more tag clusters to recommend to the user based on the user context. The clustering engine 108 can determine a maximum number of tag clusters that are to be recommended, and can select a number of tag clusters based on and up to the determined maximum. The clustering engine 108 is described below in greater detail with regards to FIG. 3. Tag clusters selected for recommendation by the clustering engine 108 can be displayed to a client 130 via the front end interface 102 and/or the content upload/serving module 104.

It should be noted that although the recommendation engine 106 and the clustering engine 108 are described separately herein, in other embodiments, they may be implemented by the same module. Further, the recommendation engine 106 and the clustering engine 108 can coordinate in the selection of tags and tag clusters for recommendation to a user. For example, if either the recommendation engine 106 or the clustering engine 108 determines a maximum number of tags or tag clusters to recommend to a user, the recommendation engine 106 and the clustering engine 108 can coordinate to weight the most relevant tags and tag clusters against each other, so that the determined maximum number of the most relevant tags and tag clusters are selected for recommendation.

Tag Recommendation

Figure 2:
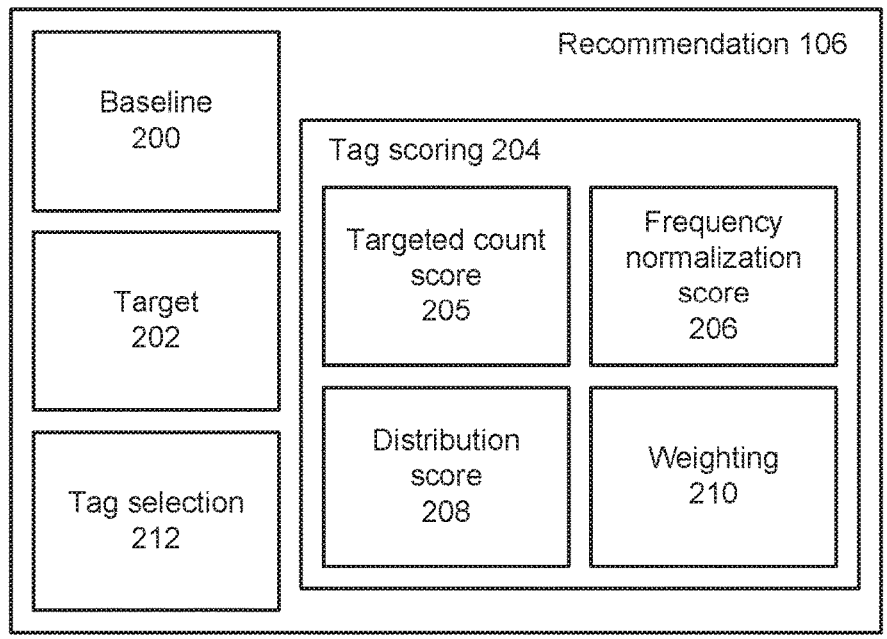
FIG. 2 illustrates the various components of a tag recommendation engine, according to one embodiment.

FIG. 2 illustrates the various components of a tag recommendation engine, according to one embodiment. The recommendation engine 106 includes a baseline module 200, a target module 202, a tag scoring module 204, and a tag selection module 212. The tag scoring module 204 determines a recommendation score for one or more tags and includes scoring modules for determining components of the recommendation score. In the embodiment of FIG. 2, the recommendation engine includes a targeted count score module 204, a frequency normalization score module 206, a distribution score module 208, and a weighting module 210. In other embodiments, the recommendation engine 106 can include fewer, additional, or different modules, the functionalities of which may be distributed or performed differently than described herein.

The recommendation engine 106 identifies a baseline set of content objects and a targeted subset of content objects, the tags associated with the targeted subset of content objects are scored based on several score components to identify the most relevant tags, and one or more tags are selected for recommendation to a user.

Baseline and Targeted Subset Selection

The baseline module 200 identifies a baseline set of content objects for use in selecting tags for recommendation, and the target module 202 identifies a targeted subset of the baseline set for user in recommending tags. In general, the baseline set of content objects is the entire corpus of content objects hosted by the content hosting service 100, though in certain embodiments, the baseline set of content objects is a subset of the corpus, for instance when it is determined that certain content objects should be excluded from consideration in recommending tags to a user.

The targeted subset of the baseline identified by the target module 202 is based on a user context. In the embodiment where the user context is the uploading of a content object by a user, the targeted subset of content objects can include content objects previously uploaded by the user, content objects previously viewed, browsed, or tagged by the user, any combination of such content objects, and the like. In one embodiment, the target subset of content objects for an uploaded content object prior to the tagging of the uploaded object is the baseline set of content objects. As the user tags the uploaded content object with one or more tags, the targeted subset is filtered based on the one or more tags.

For example, where a user tags a content object with a tag indicating that the medium of the content object is photography, the targeted subset of content objects is filtered to include only content objects tagged with the photography tag, and tags are selected for recommendation based on the filtered targeted subset. Continuing with this example, a user next tags the content object with a tag indicating that the subject matter of the content object is wildlife. The targeted subset of content objects is further filtered to include only content objects tagged with the wildlife tag, and tags are selected for recommendation based on the additionally filtered targeted subset. This process can be iterated for each new tag selected by a user, with the target module 202 identifying a new targeted subset based on the new user context resulting from each successive selection of a tag for the uploaded content object by the user.

It should be noted that although this user context is described in terms of an uploading user, the target module 202 may similarly identify a targeted subset of the baseline set in a user context where a user other than the uploading user views and/or tags a content object, and may iteratively filter the targeted subset based on successive tags selected by the viewing user for the viewed object. For example, if a user views a content object uploaded by someone else, the targeted subset can include content objects viewed by the viewing user or the uploading user, content objects uploaded by the viewing user or the uploading user, objects previously tagged by the viewing user or the uploading user, content objects with tags in common with the viewed content object, any combination of these content objects, the entire baseline set of content objects, and the like.

Where the user context is the viewing or browsing of multiple content objects, for instance in display of content object thumbnails, the target module 202 can identify a targeted subset of the baseline set by identifying content objects related to the viewed content objects, content objects previously viewed by the viewing user, content objects with tags in common with the viewed content objects, content objects other than the viewed content objects that have been viewed by other users that have viewed the viewed content objects, or any combination of these content objects.

Where the user context is the searching of content objects, for instance using a text-based keyword search implemented by the content hosting service 100, the target module 202 can identify the search results as the targeted subset of content objects. A user can search content at the content hosting service 100 by selecting a category of content objects via a content hosting service interface (for example, a user can select a "view photography" button, or input one or more keywords), and the target module 202 can identify the resulting content objects associated with the selected category as the targeted subset. A user can search content objects uploaded by a particular user, uploaded at a particular date, tagged with a particular tag, and the like at the content hosting service 100 (for example, by selecting a button associated with the user, date, or tag), and the target module 202 can identify the resulting content objects associated with the respective user, date, or tag as the targeted subset. The target module 202 can identify a targeted subset based on any other user context and using any other suitable means.

It should be noted that the number of content objects in the baseline set and the targeted subset of the baseline set can be very large, for instance millions or tens of millions. In such embodiments, a computational resource limitation may make it infeasible to consider each content object in the baseline set and the targeted set of content objects in selecting one or more tags for recommendation to a user. Accordingly, the baseline module 200 and the target module 202 can select one or more tags for recommendation associated with a subset of each of the baseline set of content objects and the targeted subset of content objects, such as the content objects retrieved from the content storage module 110 by the content hosting service 100 in the process of executing a user search, the number of content objects displayed in a browser at the client 130, a pre-determined maximum number of content objects, and the like. While the most relevant tags may be selected for recommendation in the embodiment where all content objects in the baseline set and the targeted subset of content objects are analyzed, better performance may be achieved by analyzing representative subsets of the baseline set and the targeted subset of content objects.

Tag Scoring

The tag scoring module 204 determines a recommendation score for tags based on the baseline set of content objects and the targeted subset of content objects, and is one means for performing this function. The tag scoring module 204 can determine a recommendation score for each tag associated with the targeted subset of content objects, with each tag associated with the baseline set of content objects, with a subset of the tags associated with the baseline set and/or the targeted subset, or for any tags stored in the tag storage module 112. For the purposes of simplicity, the remainder of the description herein will assume that the tag scoring module 204 determines a score for each tag associated with the targeted subset of content objects.

In one embodiment, the tag scoring module 204 determines a recommendation score $R_s$ for a given tag S associated with the targeted subset of objects using the equation:

$$R_s = \frac{w_1 + w_2 + w_3}{\frac{w_1}{R_1} + \frac{w_2}{R_2} + \frac{w_3}{R_3}} \quad (1)$$

In Equation 1, $R_1$, $R_2$, and $R_3$ represent components of the recommendation score $R_s$, and $w_1$, $w_2$, and $w_3$ represent weights used to customize and tune the tag scoring module 204. In the embodiment of FIG. 2, the targeted count score module 205 determines $R_1$, which represents a measure of the number of objects in the targeted subset of objects tagged with tag S; the frequency normalization score module 206 determines $R_2$, which represents a measure of the importance of tag S within the targeted subset of objects relative to the importance of tag S within the baseline subset of objects; the distribution score module 208 determines $R_3$ which represents a measure of the importance of tag S within the most relevant objects in the targeted subset of objects; and the weighting module 210 determines the weights $w_1$, $w_2$, and $w_3$. In another embodiment, the tag scoring module computes a recommendation score differently, for instance using a different combination of the of $R_1$, $R_2$, and $R_3$ than as described in Equation 1, using a combination of some or all of $R_1$, $R_2$, and $R_3$ other than as described in Equation 1 (such as Equation 1 with one or more of $w_1$, $w_2$, and $w_3$ set to zero), based on other score components that are in turn based on a baseline set of content objects and a targeted subset of the baseline set, or based on factors other than those described herein.

The targeted count score module 205 determines $R_1$ for a tag using the equation:

$$R_1 = 1 + \log(1 + \text{\# of tagged targeted subset objects}) \quad (2)$$

In Equation 2, the targeted count score module 205 determines $R_1$ for a tag S by determining the number of objects in the targeted subset of objects that are tagged with the tag S, and taking the logarithm of the determined number of objects. The targeted count score module 204 may modify $R_1$ by multiplying $R_1$ by a factor $A_1$:

$$A_1 = 1 + \log(1 + \text{\# of top 500 targeted subset objects tagged with tag } S) \quad (3)$$

In Equation 3, the top 500 targeted subset objects include 500 targeted subset objects determined to be the most representative or important to the baseline set of content objects. For instance, the top 500 targeted subset objects can include the first 500 content objects returned in search results, the 500 most viewed content objects, the most recent 500 content objects uploaded by an uploading user, any combination of these, or any other content objects determined to be representative content objects.

The frequency normalization score module 206 determines $R_2$ for a tag using the equation:

$$R_2 = 1 + \log\left(\frac{\% \text{ of } S \text{ tagged targeted subset objects}}{\% \text{ of } S \text{ tagged baseline set objects}}\right) \quad (4)$$

In Equation 4, the frequency normalization score module 206 determines a first proportion of the targeted subset of content objects that are tagged with tag S and determines a second proportion of the baseline set of content objects that are tagged with tag S. The frequency normalization score module 206 then divides the first proportion by the second proportion, and takes the logarithm of the resulting quotient to determine $R_2$. The resulting quotient is indicative of representativeness of tag S to the targeted subset of content objects: $R_2 = 1$ indicates that the tag is independent of the targeted subset of objects, $R_2 > 1$ indicates a positive correlation between the tag and the targeted subset of objects, and $R_2 < 1$ indicates a negative correlation between the tag and the targeted subset of objects.

The distribution score module 208 determines $R_3$ for a tag using the equations:

$$x_1 = \left(\frac{\text{\# of top targeted subset objects}}{\text{\# of targeted subset objects}}\right) \quad (5)$$

$$y_1 = \left(\frac{\text{\# of top } S \text{ tagged targeted subset objects}}{\text{\# of } S \text{ tagged targeted subset set objects}}\right) \quad (6)$$

$X_1$ represents the ratio of the number of a top ranked portion of the targeted subset of content objects to the total number of the targeted subset of content objects, and $y_1$ represents the ratio of the number of a top ranked portion of the targeted subset of content objects tagged with the tag to the total number of the targeted subset of content objects tagged with the tag. A top ranked portion of the targeted subset of content objects can be any number of the most relevant content objects to a user context, the most viewed content objects, the most favorite or liked content objects, the most recently uploaded content objects, the highest ranked content objects in search results, and the like.

In one embodiment, a pair of values, $x_1$ and $y_1$, are calculated for each of multiple thresholds of top ranked portions of the targeted subset of content objects, such as three or four pairs of values. These pairs of values are then mapped to a grid as coordinate pairs, and the distribution score module 208 fits a curve to the coordinate pairs. If the curve is above the line y=x, then the distribution of content objects tagged with tag S skews in the targeted subset of content objects towards higher ranks than the distribution of content objects in the targeted subset of content objects generally, resulting in a determined $R_3$ less than 1. If the curve is below the line y=x, then the distribution of content objects tagged with the tag skews in the targeted subset of content objects towards lower ranks than the distribution of content objects in the targeted subset of objects generally, resulting in a determined $R_3$ greater than 1. Fit curves may trend both above and below the line y=x; thus $R_3$ can be determined based on the average of the difference between the fit curve and the line y=x.

In one embodiment, $R_3$ is determined using the equation:

$$R_3 = \frac{\log x_1}{\log y_1} \quad (7)$$

$R_3$ of Equation 7 can be determined for a threshold representing a top ranked portion of the targeted subset of content objects, for instance a pre-determined threshold, such as the top 500 content objects in the targeted subset. The pre-determined threshold can be selected based on a desired balance between the accuracy of $R_3$ in representing the distribution skew of the tag relative to the targeted subset of content objects (resulting in a larger threshold representing a top ranked portion of the targeted subset of content objects) and the performance of the distribution score module 208 (resulting in a smaller threshold representing a top ranked portion of the targeted subset of content objects). The distribution score module 208 can determine the quotient $$\frac{\log x_1}{\log y_1}$$

for multiple pairs of values, $x_1$ and $y_1$, calculated for each of multiple thresholds representing top ranked portions of the targeted subset of content objects, and can determine $R_3$ to be the average of these quotients.

In an embodiment in which only a subset of the targeted subset of content objects is retrieved from the content storage module 110 (or alternatively is delivered to the client 130), hereinafter the "retrieved targeted subset of content objects", the distribution score module 208 may determine $R_3$ based on Equations 5 and 6, and the equations:

$$x_2 = \left(\frac{\text{\# of retrieved targeted subset objects}}{\text{\# of targeted subset objects}}\right) \quad (8)$$

$$y_2 = \left(\frac{\text{\# of top retrieved tagged targeted subset objects}}{\text{\# of tagged targeted subset set objects}}\right) \quad (9)$$

$$R_3 = \frac{(\log x_1 * \log y_1) + (\log x_2 * \log y_2)}{(\log x_1)^2 * (\log x_2)^2} \quad (10)$$

$R_3$ of Equation 10 may be determined for a pre-determined threshold representing a top ranked portion of the targeted subset of content objects. Alternatively, several pairs of the quotients $x_2$ and $y_2$ may be determined for multiple thresholds representing top ranked portions of the targeted subset of content objects, and may be averaged to determine the value of $R_3$. In yet another embodiment, a curve may be fit to multiple pairs of values of $x_1$ and $y_2$, and $x_2$ and $y_2$, and the value of $R_3$ may be determined based on the average distance between the fitted curve and the line $y=x$.

The weighting module 210 is configured to determine the weights $w_1$, $w_2$, and $w_3$ for use by the tag scoring module 204 in determining recommendation scores for tags. The weighting module 210 can determine a different set of weights for each user context. For example, a first set of weights $w_1$, $w_2$, and $w_3$ can be determined for recommending tags in response to a user's search query and a second set can be determined for recommending tags in response to the uploading of a content object by a user. Experimentation can be performed to determine the importance or accuracy of the recommendation score components $R_1$, $R_2$, and $R_3$, and the weights can be determined based on this experimentation to emphasize the recommendation score components determined to be more important/accurate and to de-emphasize the recommendation score components determined to be less important/accurate. For example, if it is determined that $R_1$ more accurately predicts relevant tags than $R_2$, the weighting module 210 can determine values for $w_1$ and $w_2$ such that $w_1 > w_2$. In one embodiment, the weights $w_1$, $w_2$, and $w_3$ are determined to satisfy the inequality $w_1 > w_3 > w_2$.

The result of the foregoing process is a set of scores $\{R\}$ for a corresponding set of tags S.

Tag Selection

In response to the determination of a recommendation score by the tag scoring module 204 for each tag in the targeted subset of content objects identified by the target module 202, the tag selection module 212 selects one or more tags for recommending to a user based on the determined recommendation scores. In one embodiment, the recommendation module 106 determines a maximum number of tags that can be recommended to a user (for instance based on the space available in a content hosting service interface), and the tag selection module 212 selects the determined maximum number of tags based on the determined recommendation scores. For example, if the determined maximum number of tags is 5, the tag selection module 212 can select the 5 tags with the highest recommendation scores, or can select the tag with the highest recommendation score in 5 different tag taxonomy branches.

The recommendation engine 106 recommends the selected tags to a user by, for instance, displaying the selected tags to the user in a content hosting service interface. As discussed above, selectable tags may be displayed to a user such that the tags, when selected, cause the content hosting service to perform a variety of functions. Examples of such functions include the tagging of an uploaded content object with a selected tag, the filtering of search results to display only content objects tagged with a selected tag, and the display of other content objects tagged with a selected tag during the viewing of another content object tagged with the selected tag.

Tag Clustering

Figure 3:
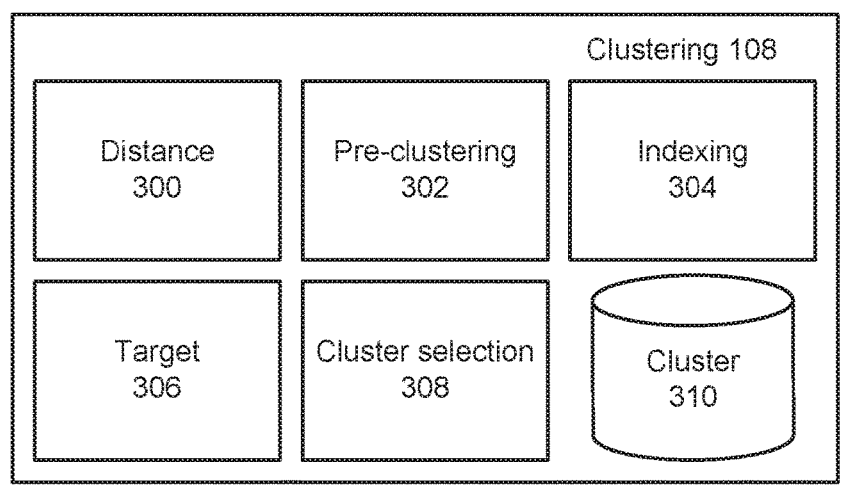
FIG. 3 illustrates the various components of a tag clustering engine, according to one embodiment.

FIG. 3 illustrates the various components of a tag clustering engine, according to one embodiment. The clustering engine 108 includes a distance module 300, a pre-clustering module 302, an indexing module 304, a target module 306, a cluster selection module 308, and a cluster storage module 310. In other embodiments, the clustering engine 108 can include fewer, additional, or different modules, the functionalities of which may be distributed or performed differently than described herein.

The clustering engine 108 determines the distance between pairs of tags stored in the tags storage module 112, clusters the tags within a cluster hierarchy based on the determined distances between tags, and creates and stores a cluster index for the cluster hierarchy (for instance, at the cluster storage module 310 or the tags storage module 112). The clustering engine 108 further identifies a targeted subset of tags based on an identified user context associated with a user of the content hosting service 100, and selects one or more tag clusters to recommend to the user based on the user context.

Tag Pair Distance Determination

The distance module 300 determines the distance between each pair of tags at the content hosting service 100 for use by the pre-clustering module 302 in clustering the tags at the content hosting service 100. The distance between two tags is a measure of how often the tags are associated with content objects in the same collection, relative to how often the tags are associated with content objects that are not in the same collection. The distance module 300 can determine the distance between each pair of tags in advance of clustering the tags, or can determine the distance between a pair of tags as needed by the pre-clustering module 302 or the clustering engine 108.

The distance module 300 can use a variant of the term frequency-inverse document frequency ("TF-IDF") weighting to determine the distance between each pair of tags, treating a collection in which each of the pair of tags is associated with at least one member as a "term", and each collection as a "document." In this embodiment, each TF-IDF weight represents the distance between the two tags, with greater TF-IDF weights representing shorter distances between the two tags, and lesser TF-IDF weights representing greater distances between the two tags.

Alternatively, the distance module 300 can determine the distance between two tags, $T_i$ and $T_j$, using the equation:

$$d(T_i, T_j) = \frac{p(T_i | T_j)}{p(T_i)} = \frac{p(T_j | T_i)}{p(T_j)} \quad (11)$$

The distance of Equation 11 represents the probability that a content object is tagged with tag $T_i$ given that it is tagged with tag $T_j$, divided by the probability that the content object is tagged with the tag $T_i$.

In addition, the distance module 300 can determine the distance between two tags using the equation:

$$d(T_i, T_j) = \sqrt{p(T_i | T_j) * p(T_j | T_i)} \quad (12)$$

The distance of Equation 12 represents the square root of the product of the probability that a content object is tagged with tag $T_i$ given that it is tagged with tag $T_j$ and the probability that a content object is tagged with tag $T_j$ given that it is tagged with tag $T_i$.

The distance module 300 can compute each probability $p(T_i)$ and $p(T_i|T_j)$ for all tags in at the content hosting service 100 exhaustively, though this process is resource-intensive, and may be technologically infeasible with a large number of tags (for instance, several million or more). To accommodate this technological restraint, the distance module 300 can instead estimate probabilities $p(T_i)$ and $p(T_i|T_j)$ using the equations:

$$p(T_i) = \frac{\sum_{c \in Z} w_c * r_1(\#T_i(c), N(c))}{\sum_{c \in Z} w_c} \quad (13)$$

$$p(T_i T_j) = \frac{\sum_{c \in Z} w_c * r_2(\#T_i(c), \#T_j(c), N(c))}{\sum_{c \in Z} w_c} \quad (14)$$

In Equations 13 and 14, for each collection c in a set of collections z, $\#T_i(c)$ represents the number of occurrences of tag $T_i$ in a collection c, N(c) represents the number of content objects in the collection c, and $w_c$ represents a weight determined for the collection c (described below). Further, the functions $r_1$ and $r_2$ are defined by the equations:

$$r_1(f, g) = \frac{f + 4/k}{g + 4} \quad (15)$$

$$r_2(f, g, h) = \frac{f * g + 8/(k(k-1))}{(h+4)(h+3)} \quad (16)$$

In Equations 15 and 16, k represents the total number of tags at the content hosting service 100. Note that for large collections (for instance, collections containing ~50 content objects or more), the distance module 300 may use the estimations of the equations:

$$r_1(f, g) \approx \frac{f}{g} \quad (17)$$

$$r_2(f, g, h) \approx \frac{f * g}{h^2} \quad (18)$$

The distance module 300 can determine the weight $w_c$ for each collection c based on the entropy of the tags of the collection c. In one embodiment, collections with small entropies have larger weights $w_c$ than collections with large entropies. In one embodiment, the distance module 300 determines the weight $w_c$ using the equation:

$$w_c = \left(-\sum_{i \in Q} p(T_i) \log p(T_i)\right) - 1 \quad (19)$$

In Equation 19, Q represents the set of tags associated with content object members of collection c. In addition, $p(T_i)$ is computed using, for instance, Equation 13.

Cluster Hierarchy Generation

The pre-clustering module 302 generates a multi-level cluster hierarchy based on the distances between tags computed by the distance module 300, with each cluster level in the cluster hierarchy including one or more clusters of tags at the content hosting service 100. In an embodiment where the content hosting service 100 includes a set of N tags, the cluster hierarchy is generated to have N levels, each with an index defining the number of clusters at the level. In this embodiment, the top level, level 1, has one cluster, to which each of the N tags belongs, and the bottom level, level N, has N clusters, to each of which one tag belongs. Clusters, including clusters at the same level of the cluster hierarchy, can include varying numbers of tags.

The pre-clustering module 302 can generate the clusters at each cluster level sequentially (cluster level 1, cluster level 2, ... ), non-sequentially (cluster level 1, cluster level 4, cluster level 2, ... ), or simultaneously. In one embodiment, the pre-clustering module 302 generates the clusters for levels sequentially beginning at level 1 and ending at level N; alternatively, the pre-clustering module 302 can generate the clusters sequentially beginning at level N and ending at level 1. The pre-clustering module 302 can generate the clusters in one level based on the clusters of another level. For example, the pre-clustering module 302 can, to generate a second level based on a first level, split a cluster in the first level into two clusters for the second level, or combine two clusters in the first level into one cluster for the second level.

To generate clusters of tags at a particular cluster level, the pre-clustering module 302 can optimize a cost function describing the distance between tags such that the distance between tags in each cluster at the cluster level is minimized. Such a cost function can include a sum of squares of distances between tags; in this embodiment, the pre-clustering module 302 can group tags into particular clusters such that the sum of squares of distances between tags in the clusters is minimized or substantially minimized. The pre-clustering module 302 may optimize such a cost function using simulated annealing or any other suitable optimization technique, and may iteratively attempt to optimize the cost function based on a desired balance between optimization performance and available computing resources and time. In one embodiment, the pre-clustering module 302 groups tags into clusters by fixing N (the number of clusters) and minimizing the distance sum E(N) in the equation:

$$E(N) = \sum_{n=1}^{N} \sum_{i<j; T_i, T_j \in C_n} d(T_i, T_j)^2 \quad (20)$$

In Equation 20, $C_n$ is the nth tag cluster, and $d(T_i, T_j)^2$ can be determined using Equations 11 and 12. The minimum distance sums E(N) indicate which tags $T_q$ belong in which cluster $C_n$. Note that Equation 20 minimizes intra-cluster distances, but ignores inter-cluster distances. In other embodiments, other means can be used to group tags into clusters, for instance by using K-means clustering or any other suitable form of distance minimization. The pre-clustering module 302 can generate initial indexes for the generated clusters at each cluster level. For example, if the pre-clustering module 302 can assign an index of "1" to the first generated cluster in a particular cluster level, an index of "2" to the second generated cluster, and so forth.

FIG. 4a is a diagram illustrating an example clustered hierarchy for a set of tags, according to one embodiment. In the embodiment of FIG. 4a, the pre-clustering module 302 generates a cluster hierarchy with at least 5 tags (and accordingly, at least 5 levels), though only tags 1-5 and cluster levels 1-5 are shown for the purposes of simplicity. Cluster level 1 includes 1 tag cluster, and all tags are assigned to this cluster (indicated by the index "1" assigned to each tag). Cluster level 2 includes 2 tag clusters, with tags 1 and 4 grouped into a cluster assigned cluster index "1", and tags 2, 3, and 5 grouped into a cluster assigned cluster index "2". Cluster level 3 includes 3 tag clusters, with tag 3 grouped into a cluster assigned cluster index "1", tag 4 grouped into a cluster assigned cluster index "2", and tags 1, 2, and 5 grouped into a cluster assigned cluster index "3". Cluster level 4 includes 4 tag clusters, with tag 3 grouped into a cluster assigned cluster index "1", tags 2 and 5 grouped into a cluster assigned cluster index "2", tag 1 grouped into a cluster assigned cluster index "3", and tag 4 grouped into a cluster assigned cluster index "4". Cluster level 5 includes 5 tag clusters, with each of tags 1-5 grouped into a different cluster.

Cluster Hierarchy Indexing

The indexing module 304 generates updated indexes for the clusters of the cluster hierarchy generated by the pre-clustering module 302. The indexing module 304 stores the updated indexes for the cluster hierarchy in the cluster storage module 310, for instance after optimizing the indexes for the clusters of the cluster hierarchy. Alternatively, the indexing module 304 can store the indexes for each tag at the lowest level of cluster hierarchy, and can store just the moves of each tag between cluster indexes for the set of cluster indexes (for instance, the cluster index associated with a cluster to which a tag belongs, and the level of cluster hierarchy at which the tag switches to a cluster with a different cluster index, for each cluster and tag); such a storage scheme beneficially minimizes the amount of information that must be stored to describe the cluster hierarchy. By optimizing the indexes for the clusters of the cluster hierarchy, this amount of information can be further reduced.

FIG. 4b is a diagram illustrating the example cluster hierarchy of FIG. 4a with clusters optimally indexed to minimize the cluster index moves for tags in the set of tags, according to one embodiment. In the embodiment of FIG. 4a, the total number of moves between clusters of different indexes made by each of tags 1-5 (hereinafter "index deltas") from level 1 to level 5 is as follows:

Tag 1: 2 (index ("I") 1, level ("L") 1 to I3, L3 to I4, L5)
Tag 2: 3 (I1, L1 to I2, L2 to I3, L3 to I2, L4)
Tag 3: 3 (I1, L1 to I2, L2 to I1, L3 to I3, L5)
Tag 4: 3 (I1, L1 to I2, L3 to I4, L4 to I1, L5)
Tag 5: 4 (I1, L1 to I2, L2 to I3, L3 to I2, L4 to I5, L5)

Accordingly, the average number of cluster index moves in the embodiment of FIG. 4a for tags 1-5 from level 1 to level 5 is 3. In the optimized embodiment of FIG. 4b, the total number of index deltas from level 1 to level 5 for tags 1-5 is as follows:

Tag 1: 3 (I1, L1 to I2, L2 to I1, L3 to I4, L4)
Tag 2: 0 (I1, L1)
Tag 3: 1 (I1, L1 to I3, L3)
Tag 4: 1 (I1, L1 to I2, L2)
Tag 5: 1 (I1, L1 to I5, L5)

Accordingly, the average number of cluster index moves in the embodiment of FIG. 4b for tags 1-5 from level 1 to level 5 is 1.2, resulting in less information required to describe the same cluster hierarchy but with cluster indexes assigned differently. Thus, by intelligently assigning indexes to clusters at each level of cluster hierarchy, the total amount of information that must be stored to describe the cluster hierarchy can be minimized.

The indexing module 304 can use any method to optimize the indexes of the cluster hierarchy. As illustrated in the embodiment of FIG. 4b, the indexing module 304 can optimize the indexes of the cluster hierarchy by minimizing the number of moves each tag makes between various cluster indexes through sequential levels of the cluster hierarchy. The total number of index deltas for a particular tag is the number of times the index for the cluster to which the tag belongs changes from level 1 to the top level N. The indexing module 304 minimizes (or minimizes to the best extent possible given performance and timing constraints) the average total number of index deltas for the set of tags in the cluster hierarchy by methodically reassigning cluster indexes.

The indexing module 304 can use simulated annealing to minimize the average total number of index deltas for the set of tags in a cluster hierarchy. The indexing module 304 begins the index delta optimization process using a set of initial cluster indexes. In one embodiment, the set of initial cluster indexes is a set of initial cluster indexes assigned by the pre-clustering module 302; alternatively, the indexing module 304 may randomly assign a set of initial indexes to the tag clusters generated by the pre-clustering module 302. The indexing module 304 then determines the total number of index deltas for the set of tags using the set of initial cluster indexes, and the average of the total number of index deltas for the set of tags.

Next, the indexing module 304 selects two clusters at random within the same level of cluster hierarchy, swaps the indexes assigned to the selected clusters, and determines if the average of the total number of index deltas for the set of tags decreases in response to the index swap. If the average of the total number of index deltas decreases, then the index swap is maintained, and the set of cluster indexes is updated based on the maintained index swap. This process is iteratively repeated, beginning with the use of the set of initial cluster indexes, and subsequently with the use of the iteratively updated set of cluster indexes. If the indexing module 304 determines that the average of the total number of index deltas increases, then the indexing module 304 can either reject the index swap (resulting in the set of cluster indexes being unchanged), or the indexing module 304 can maintain the index swap.

The decision to reject or maintain the index swap in the event of the average of the total number of index deltas increasing can be made randomly, for instance based on a determined percentage of maintained average-increasing index swaps. The determined percentage of maintained average-increasing index swaps can decrease over time. For example, the indexing module 304 may decide to keep 80% of average-increasing index swaps at the beginning of the optimization of cluster indexes, and may decrease this percentage by 10% every 100 swaps or 30 minutes. The decision to reject or maintain the index swap in the event of an average-increase index swap can also be made based on how much the average of the total number of index deltas increases. In such an embodiment, the indexing module 304 may maintain index swaps resulting in minor average increases more often than index swaps resulting in substantial average increases.

The indexing module 304 can iterate through the simulated annealing steps described above for a pre-determined amount of time, or until the indexing module 304 fails to meet a performance threshold in the minimization of the average of the total number of index deltas (for instance, when the returns of efforts to minimize the average of the total number of index deltas diminishes below a particular threshold). Once the indexing module 304 ends the optimization process, the optimized index deltas are stored in the cluster storage module 304 for use by the cluster selection module 308.

It should be noted that in other embodiments, the indexing module 304 may use other forms of simulated annealing, or other methods of optimizing the indexes of a cluster hierarchy, than those described herein. In addition, it should be noted that instead of or in addition to storing cluster indexes or index moves for each tag, the pre-clustering module 302 can stored the generated cluster hierarchy in the cluster storage module 310. Finally, it should be noted that instead of or in addition to storing the cluster hierarchy and/or the cluster indexes or index moves for each tag in the cluster storage module 310, the clustering engine 108 can store this information in the tags storage module 112, or at any other storage entity.

Targeted Subset Selection

The target module 306 identifies a targeted subset of tags for use in recommending tag clusters to a user. The targeted subset of tags is identified based on the user context identified by the clustering engine 108. In the embodiment where the user context is the uploading of a content object by a user, the target subset of tags can include the set of tags associated with any combination of content objects previously uploaded, viewed, browsed, or tagged by the user, and can include any combination of tags associated with content objects tagged with tags that the user has selected for the content object being uploaded. For example, if a user uploads a content object and tags the content object with the tag "photograph", the targeted subset of tags can be the set of tags used to tag other content objects at the content hosting service 100 that are also tagged with the "photograph" tag. Subsequently, if the user tags the uploaded content object with the "black and white" tag, the targeted subset of tags can be filtered down to the set of tags used to tag other content objects at the content hosting service 100 that are also tagged with both the "photograph" and "black and white" tags.

In the embodiment where the user context is the viewing or browsing of content objects, the target module 306 can identify a targeted subset of tags including tags used to tag content objects related to the viewed content objects, tags used to tag content objects previously viewed by the viewing user, tags used to tag content objects in collections with the viewed content objects, tags used to tag content objects with tags in common with the viewed content objects, tags used to tag content objects other than the viewed content objects that have also been viewed by other users that have viewed the viewed content objects, and the like.

In the embodiment where the user context is the searching of content objects, the target module 306 can identify a targeted subset of tags including tags used to tag content objects in the search results. For instance, if a text-based keyword search returns a set of content object results, the targeted subset of tags can include all of the tags used to tag the returned set of content objects. In the event that a very high number of search results are returned, the targeted subset of tags can include the tags used to tag a top threshold of search results, for instance, the 500 most relevant search results.

Tag Cluster Selection

The cluster selection module 308 selects one or more clusters to recommend to a user based on the user context identified by the clustering module 108, the targeted subset of tags identified by the target module 306, and the stored cluster hierarchy. The cluster selection module 308 determines a quantity of clusters for recommendation to a user based on the user context. In one embodiment, the determined quantity of clusters for recommendation may be based on available space within a content hosting service interface. For example, if the identified user context is the searching of context objects, and a portion of the search interface has room to display 3 tag or tag cluster recommendations, the cluster selection module 308 may determine to recommend 3 tag clusters. Alternatively, the cluster selection module 308 can coordinate with the recommendation module 106, and can determine to recommend a quantity of tag clusters that makes up a subset of the total number of tags and tag clusters that can be displayed within an interface. For example, if an interface associated with the identified user context has room to display 7 tags or tag cluster recommendations, the recommendation module 106 can display 2 tags for recommendation and the cluster selection module 308 can determine to recommend 5 tag clusters.

The cluster selection module 308 selects a cluster level in the stored cluster hierarchy that contains all or threshold percentage of the identified targeted subset of tags within the determined quantity of clusters, and selects the clusters containing the identified targeted subset of tags within the selected cluster level for recommendation to a user. For example, if the target module 306 identifies a targeted subset of 40 tags and if the cluster selection module 308 determines to recommend 5 clusters, the cluster selection module 308 then queries the stored cluster hierarchy to identify a set of 5 clusters within one cluster level that contain all 40 of the targeted subset of tags. The identified set of 5 clusters is then displayed to a user within the particular user context associated with the user.

To select clusters within a cluster level containing all or a threshold percentage of the targeted subset of tags, the cluster selection module 308 can start at the lowest level of the stored cluster hierarchy. At the lowest level of cluster hierarchy, a targeted subset of w tags is represented by w clusters. The cluster selection module 308 iteratively moves up levels of the cluster hierarchy, determining at each iteration whether the number of clusters representing all or a threshold percentage of the targeted subset of tags is equal to or less than the quantity of tag clusters determined by the cluster selection module 308 for recommendation. If the cluster selection module 308 determines that the number of clusters at a particular cluster level representing all or a threshold percentage of the targeted subset of tags is equal to or less than the desired quantity of tag clusters for recommendation, the cluster selection module 308 displays the clusters representing all or the threshold percentage of the targeted subset of tags to the user; otherwise, the cluster selection module 308 continues to iterate up the cluster hierarchy until this or another end condition is satisfied. One such alternative end condition is that the average of the sum of squares of the distances between tags in each cluster exceeds a pre-determined threshold. In the event that an alternative end condition is satisfied, the most relevant clusters (for instance, the clusters containing the most tags in the targeted subset of tags) can be recommended to the user.

In one embodiment, the cluster selection module 308 initially queries the stored cluster hierarchy stored at the cluster storage module 310 using unique identifies associated with each tag in the targeted subset of tags, and receives a cluster index associated with each tag in the targeted subset of tags associated with the lowest level of cluster hierarchy. Subsequently, each time the cluster selection module 308 queries the stored cluster hierarchy using the identifiers associated with each tag in the targeted subset of tags for successively higher levels of cluster hierarchy, the cluster selection module 308 receives the index deltas for the tags in the targeted subset of tags for each successively higher level of cluster hierarchy. In such an embodiment, the cluster selection module 308 updates the received cluster indexes associated with the targeted subset of tags at the lowest level of cluster hierarchy with the received index deltas at each higher level of cluster hierarchy. The cluster selection module 308 then determines from the updated received cluster indexes the number of clusters representing the targeted subset of tags, and continues to query the stored cluster hierarchy until the updated received cluster indexes indicate that all or a threshold percentage of the targeted subset of tags are represented by the determined quantity of tag clusters for recommendation (or less).

Operation

Figure 5:
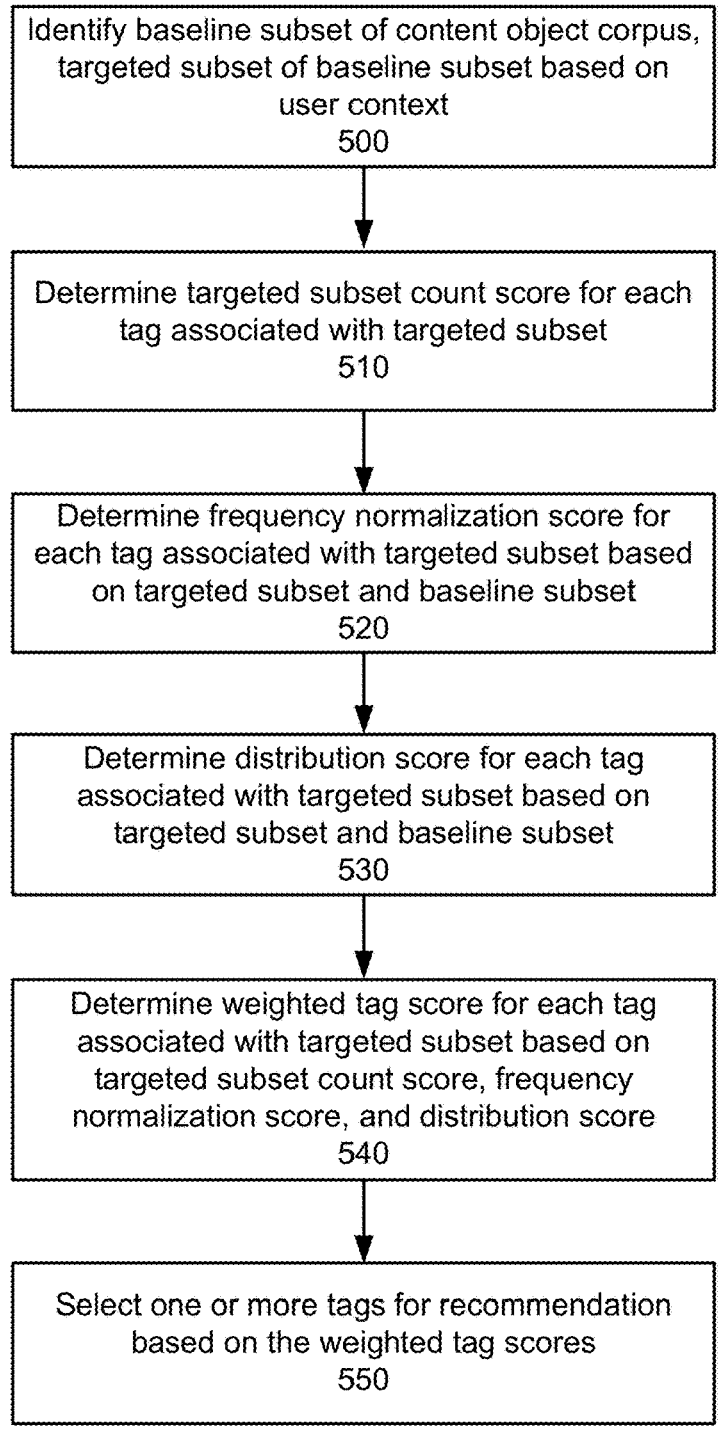
FIG. 5 is a flowchart of a process for selecting one or more tags for recommendation to a user, according to one embodiment.

FIG. 5 is a flowchart of a process for selecting one or more tags for recommendation to a user, according to one embodiment. A baseline subset of a content object corpus and a targeted subset of the baseline subset are identified 500 for use in recommending content objects to a user. The baseline subset of the content object corpus may be the entire content object corpus, or may be a portion of the content object corpus related to a user context. The targeted subset of the baseline subset is based on the user context associated with a user. The user context may be the viewing/browsing of content objects by the user, the uploading and tagging of a content object by the user, the searching of content objects by the user, previous actions of the user or other users (such as the co-browsing, co-viewing, or co-searching of content objects), and the like. Accordingly, the targeted subset of the baseline subset may be content objects previously viewed/browsed by the user or by other users, content objects previously uploaded or tagged by the user or other users, content objects occurring in search results during previous searches by the user or other users, and the like.

The targeted subset count score is determined 510 for each tag associated with the targeted subset of content objects, for instance, all tags used to tag objects in the targeted subset of content objects. The targeted subset count score for a tag can be determined based on the number of content objects in the targeted subset of content objects that are tagged with the tag. The frequency normalization score is determined 520 for each tag associated with the targeted subset of content objects. The frequency normalization score for a tag can be determined based on the percentage of the targeted subset of content objects that are tagged with the tag relative to the percentage of the baseline subset of content objects that are tagged with the tag. The distribution score is determined 530 for each tag associated with the targeted subset of content objects. The distribution score for a tag can be determined based on the number of the targeted subset content objects that are retrieved (for instance, from a server) relative to the total number of targeted subset content objects and based on the number of top and/or relevant retrieved content objects in the targeted subset of content objects that are tagged with the tag relative to the number of content objects in the targeted subset of content objects that are tagged with the tag.

A weighted tag score is determined 540 for each tag associated with the targeted subset of content objects. The weighted tag score for a tag is determined based on the targeted subset count score associated with the tag, the frequency normalization score associated with the tag, and the distribution score associated with the tag. The weighted tag score may also be determined based on a set of weights associated with the targeted subset of content objects. The set of weights may include one weight for each of the targeted subset count scores, the frequency normalization scores, and the distribution scores, and may be determined at least in part based on a desired relative importance for each of these sets of scores. One or more tags are then selected 550 for recommendation to a user based on the determined weighted tag scores.

Figure 6:
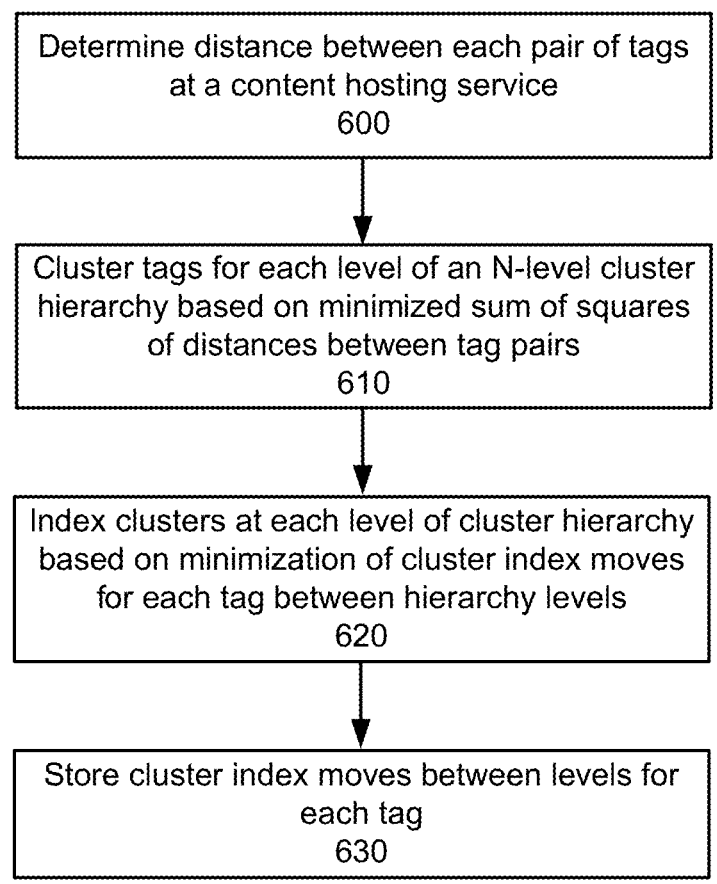
FIG. 6 is a flowchart of a process for generating a tag cluster and a cluster index, according to one embodiment.

FIG. 6 is a flowchart of a process for generating a tag cluster and a cluster index, according to one embodiment. The distance between each pair of tags is determined 600 at a content hosting service. The distance between a pair of tags is based on the conditional probability that a content object is tagged with a first of the pair of tags given that it is tagged with a second of the pair of tags, relative to the probability that the content object is tagged with the first of the pair of tags. These probabilities can be exhaustively determined by analysis of all tags at the content hosting service, or can be estimated based on the number of occurrences of each tag in collections of content objects.

The tags are clustered 610 for each level of an N-level cluster hierarchy based on the determined distance between tags, where N is the number of tags at the content hosting service. The tags can be clustered by optimizing a cost function representing the sum of squares of the distances between tags. The tag clusters are indexed 620 at each level of the cluster hierarchy based on the minimization of the cluster index moves for each tag between hierarchy levels and clusters. The cluster index moves between cluster hierarchy levels are stored 630 for each tag.

Figure 7:
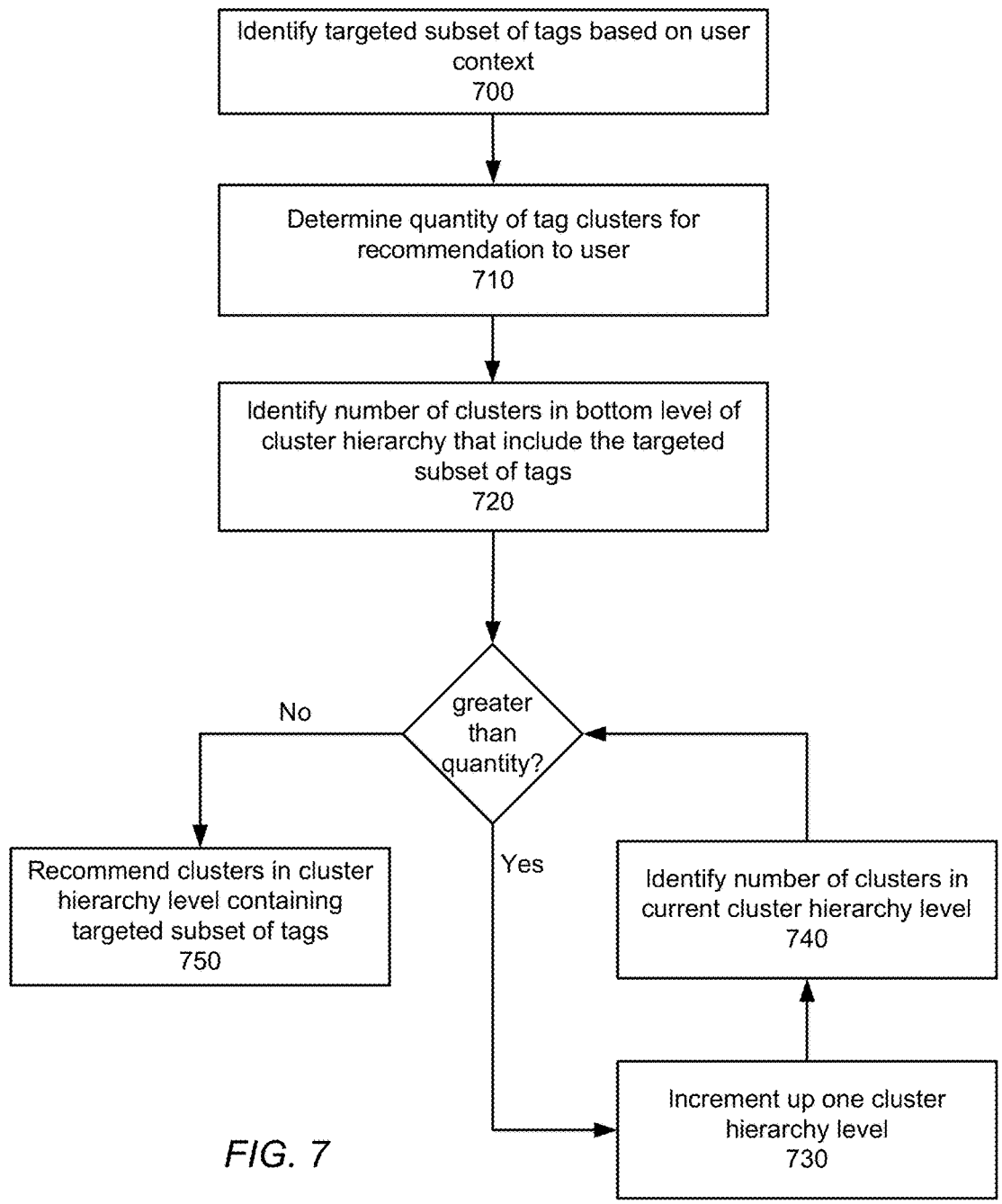
FIG. 7 is a flowchart of a process for selecting one or more tag clusters for recommendation to a user, according to one embodiment.

FIG. 7 is a flowchart of a process for selecting one or more tag clusters for recommendation to a user, according to one embodiment. A targeted subset of tags is identified 700 based on a user context associated with a user. The user context may be the viewing/browsing of content objects by the user, the uploading and tagging of a content object by the user, the searching of content objects by the user, previous actions of the user or other users (such as the co-browsing, co-viewing, or co-searching of content objects), and the like. Accordingly, the targeted subset of tags may be tags used to tag content objects previously viewed/browsed by the user or by other users, tags used to tag content objects previously uploaded or tagged by the user or other users, tags used to tag content objects occurring in search results during previous searches by the user or other users, and the like.

A quantity of tag clusters is determined 710 for recommendation to the user. The determined quantity of tag clusters can be based on the amount of space available for displaying recommended tag clusters to a user within a content hosting service interface. The number of clusters containing all or a threshold percentage of the targeted subset of tags at the bottom level of the cluster hierarchy is determined 720. If the number of clusters containing all or a threshold percentage of the targeted subset of tags exceeds the determined quantity of tag clusters for recommendation to the user, the cluster hierarchy is incremented 730 up one level, and the number of clusters at the current cluster hierarchy level containing all or a threshold percentage of the targeted subset of tags is identified 740. This process is iteratively repeated until the number of clusters at the current cluster hierarchy level containing all or a threshold percentage of the targeted subset of tags does not exceed the determined quantity of tag clusters for recommendation to the user, at which point the clusters containing all or a threshold percentage of the targeted subset of tags at the current cluster hierarchy level are recommended 750 to the user. Alternatively, a top number of the most relevant tag clusters at the current cluster hierarchy level can be recommended to the user if an alternative end condition is satisfied. It should be noted cluster index moves can be used to identify the number of clusters in each cluster hierarchy level that contain all or a threshold percentage of the targeted subset of tags.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of selecting content object tags for recommendation to a user of a content hosting service, the method comprising:
identifying a baseline subset of content objects within a content object corpus having over 100,000 content objects therein at the content hosting service based on a user context at the content hosting service, wherein said user context is one of: browsing for content objects, searching for content objects, or uploading content objects;
identifying a targeted subset of the baseline subset of content objects based on the user context, wherein each content object in the targeted subset of content objects is associated with one or more tags;
for each tag associated with the targeted subset of content objects:
determining a targeted subset count score for the tag based on a function of a logarithm of the number of content objects in the targeted subset of content objects tagged with the tag;
multiplying the targeted subset count score by a value based on a function of a logarithm of a number of content objects tagged with the tag among a fixed number of representative content objects in the targeted subset, to produce a modified targeted subset count score for the tag;
determining a frequency normalization score for the tag based on the proportion of the targeted subset of content objects that are tagged with the tag relative to the proportion of the baseline subset of content objects that are tagged with the tag;
determining a distribution score for the tag based on the proportion of the most relevant content objects in the targeted subset of content objects that are tagged with the tag; and
determining a combined tag score for the tag based on the modified targeted subset count score for the tag, the frequency normalization score for the tag, and the distribution score for the tag;
selecting one or more tags for recommendation to the user based on the determined combined tag scores; and
receiving tags selected by the user from among the recommended tags; and
performing an operation on the content object corpus for the user context using the selected tags.

2. The method of claim 1, wherein, when the user context comprises browsing for content objects, the targeted subset of content objects comprises one or more of: content objects previously viewed by the user, content objects previously viewed by other users, and content objects related to content objects previously viewed by the user and/or other users.

3. The method of claim 1, wherein, when the user context comprises searching for content objects, the targeted subset of content objects comprises content object search results received in response to the searching of content objects by the user.

4. The method of claim 1, wherein, when the user context comprises uploading content objects, the targeted subset of content objects comprises content objects other than the uploaded content object that are tagged with all or part of the one or more tags.

5. The method of claim 1, wherein said determining a combined tag score for a tag comprises calculating a harmonic mean of the targeted subset count score for the tag, the frequency normalization score for the tag, and the distribution score for the tag.

6. The method of claim 1, wherein the combined tag scores are further based on weight coefficients, wherein one weight coefficient is associated with each of the targeted subset count scores, the frequency normalization scores, and the distribution scores.

7. The method of claim 6, wherein the weight coefficients are pre-determined based on a desired relative importance of each of the targeted subset count scores, the frequency normalization scores, and the distribution scores.

8. The method of claim 1, wherein selecting one or more tags for recommendation comprises:
   determining a quantity of tags to be recommended to the user based on available space within a user interface; and
   selecting the quantity of tags with the highest weighted tag scores for recommendation.

9. The method of claim 8, further comprising:
   displaying the selected quantity of tags to the user within the user interface.

10. A non-transitory computer-readable storage medium having executable computer program instructions embodied therein for selecting content object tags for recommendation to a user of a content hosting service, the computer program instructions configured to, when executed, cause a computer to:
   identify a baseline subset of content objects within a content object corpus having over 100,000 content objects therein at the content hosting service based on a user context at the content hosting service, wherein said user context is one of: browsing for content objects, searching for content objects, or uploading content objects;
   identify a targeted subset of the baseline subset of content objects based on the user context, wherein each content object in the targeted subset of content objects is associated with one or more tags;
   for each tag associated with the targeted subset of content objects:
      determine a targeted subset count score for the tag based on a function of a logarithm of the number of content objects in the targeted subset of content objects tagged with the tag;
      multiplying the targeted subset count score by a value based on a function of a logarithm of a number of content objects tagged with the tag among a fixed number of representative content objects in the targeted subset, to produce a modified targeted subset count score for the tag;
      determine a frequency normalization score for the tag based on the proportion of the targeted subset of content objects that are tagged with the tag relative to the proportion of the baseline subset of content objects that are tagged with the tag;
      determine a distribution score for the tag based on the proportion of the most relevant content objects in the targeted subset of content objects that are tagged with the tag; and
      determine a combined tag score for the tag based on the modified targeted subset count score for the tag, the frequency normalization score for the tag, and the distribution score for the tag;
   select one or more tags for recommendation to the user based on the determined combined tag scores; and
   receive tags selected by the user from among the recommended tags; and
   perform an operation on the content object corpus for the user context using the selected tags.

11. The non-transitory computer-readable storage medium of claim 10, wherein said determining a combined tag score for a tag comprises calculating a harmonic mean of the targeted subset count score for the tag, the frequency normalization score for the tag, and the distribution score for the tag.

12. The non-transitory computer-readable storage medium of claim 10, wherein the combined tag scores are further based on weight coefficients, wherein one weight coefficient is associated with each of the targeted subset count scores, the frequency normalization scores, and the distribution scores.

13. The non-transitory computer-readable storage medium of claim 12, wherein the weight coefficients are pre-determined based on a desired relative importance of each of the targeted subset count scores, the frequency normalization scores, and the distribution scores.

14. The non-transitory computer-readable storage medium of claim 10, wherein selecting one or more tags for recommendation comprises:
   determining a quantity of tags to be recommended to the user based on available space within a user interface; and
   selecting the quantity of tags with the highest weighted tag scores for recommendation.

15. The non-transitory computer-readable storage medium of claim 14, wherein the computer program instructions are further configured to cause a computer to:
   display the selected quantity of tags to the user within the user interface.

16. A computer system for selecting content object tags for recommendation to a user of a content hosting service, the system comprising:
   a computer processor; and
   a non-transitory computer-readable storage medium storing executable computer program instructions configured to, when executed by the processor, cause the computer system to:
      identify a baseline subset of content objects within a content object corpus having over 100,000 content objects therein at the content hosting service based on a user context at the content hosting service, wherein said user context is one of: browsing for content objects, searching for content objects, or uploading content objects;
      identify a targeted subset of the baseline subset of content objects based on the user context, wherein each content object in the targeted subset of content objects is associated with one or more tags;

for each tag associated with the targeted subset of content objects:
- determine a targeted subset count score for the tag based on a function of a logarithm of the number of content objects in the targeted subset of content objects tagged with the tag;
- multiplying the targeted subset count score by a value based on a function of a logarithm of a number of content objects tagged with the tag among a fixed number of representative content objects in the targeted subset, to produce a modified targeted subset count score for the tag;
- determine a frequency normalization score for the tag based on the proportion of the targeted subset of content objects that are tagged with the tag relative to the proportion of the baseline subset of content objects that are tagged with the tag;
- determine a distribution score for the tag based on the proportion of the most relevant content objects in the targeted subset of content objects that are tagged with the tag; and
- determine a combined tag score for the tag based on the modified targeted subset count score for the tag, the frequency normalization score for the tag, and the distribution score for the tag;

select one or more tags for recommendation to the user based on the determined combined tag scores; and receiving tags selected by the user from among the recommended tags; and performing an operation on the content object corpus for the user context using the selected tags.

17. The computer system of claim 16, wherein said determining a combined tag score for a tag comprises calculating a harmonic mean of the targeted subset count score for the tag, the frequency normalization score for the tag, and the distribution score for the tag.

18. The computer system of claim 16, wherein the combined tag scores are further based on weight coefficients, wherein one weight coefficient is associated with each of the targeted subset count scores, the frequency normalization scores, and the distribution scores.

19. The computer system of claim 18, wherein the weight coefficients are pre-determined based on a desired relative importance of each of the targeted subset count scores, the frequency normalization scores, and the distribution scores.

20. The computer system of claim 16, wherein selecting one or more tags for recommendation comprises:
- determining a quantity of tags to be recommended to the user based on available space within a user interface; and
- selecting the quantity of tags with the highest weighted tag scores for recommendation.

21. The computer system of claim 20, wherein the computer program instructions are further configured to cause the computer system to:
- display the selected quantity of tags to the user within the user interface.

22. A computer implemented method of selecting content object tags for recommendation to a user of a content object hosting service, the method comprising:
- identifying a set of content objects from among over 100,000 content objects based on a user context at the content object hosting service, wherein each content object is tagged with one or more tags and wherein said user context is one of: browsing for content objects, searching for content objects, or uploading content objects;
- for each of the tags used to tag the content objects in the set of content objects:
  - determining a targeted subset count score for the tag based on a function of a logarithm the number of content objects in the set of content objects tagged with the tag;
  - multiplying the targeted subset count score by a value based on a function of a logarithm of a number of content objects tagged with the tag among a fixed number of representative content objects in the targeted subset, to produce a modified targeted subset count score for the tag;
- determining a frequency normalization score for the tag based on the proportion of content objects in the set of content objects tagged with the tag relative to the proportion of all content objects at the content object hosting service tagged with the tag;
- determining a distribution score for the tag based on the proportion of the most relevant content objects in the set of content objects tagged with the tag; and
- determining a combined tag score for the tag based on the modified targeted subset count score for the tag, the frequency normalization score for the tag, and the distribution score for the tag;
- selecting one or more tags for recommendation to the user based on the determined combined tag scores; and
- receiving tags selected by the user from among the recommended tags; and
- performing an operation on the content object corpus for the user context using the selected tags.

* * * * *